United States Patent Office 2,962,495
Patented Nov. 29, 1960

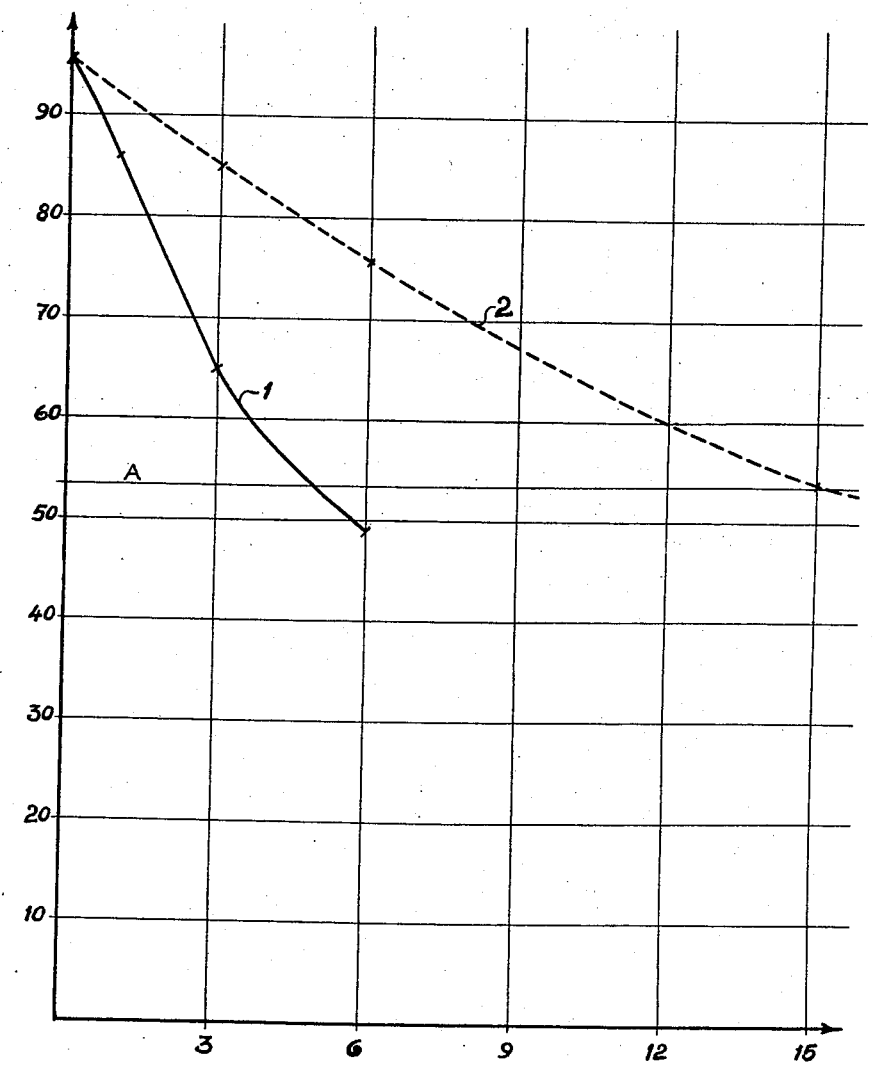

2,962,495
POLYMER PHOSPHORIC ACID ANTI-ENZYMATIC SUBSTANCES

Ove Birger Fernö, Hans Jakob Fex, and Torsten Ove Enok Linderot, Halsingborg, Sweden, Ernst Thomas Rosenberg, Orholm Pr. Lyngby, Denmark, and Knut Bertil Högberg, Halsingborg, Sweden, assignors to Aktiebolaget Leo, Halsingborg, Sweden, a firm Filed June 17, 1953, Ser. No. 362,311

Claims priority, application Sweden June 21, 1952

7 Claims. (Cl. 260—210)

The present invention relates to substances with anti-enzymatic properties, particularly against hyaluronidase, and to a method for the production of such substances.

Earlier investigations by applicant have shown that by phosphorylating di- and polyhydroxy flavones or flavanones or the corresponding di- or polyhydroxy chalcones or dihydro-derivatives thereof under suitable conditions more or less high-molecular compounds are obtained which are formed as the result of a combined condensation and polymerization. The compounds produced in this manner are highly negatively charged and in each case soluble in water at neutral or alkaline reaction. They are distinguished by having an anti-enzymatic effect against certain enzymes, particularly hyaluronidase. By some of the said starting materials, for instance phloretin, such effect may be present even when the said substances are not phosphorylated, but the effect is strongly increased by the said polymerization products with phosphoric acid, in comparision with the corresponding material.

J. M. Beiler and J. G. Martin (Journal of Biol. Chem. 174, 31 (1948) have previously found that in certain cases the introduction of phosphate and sulphuric acid groups may increase the effect of anti-enzymatic substances. In phosphorylated hesperidin, for instance, which is a mixture of the pentaphosphate and the tetraphosphate, it is thus possible to demonstrate an increase of the inhibitory effect against hyaluronidase, but the obtained effect is less than that which can be obtained with known substances, for instance suramin.

In the following and throughout the descriptive portion of this specification and in the appended claims wherever the terms "phosphoric acid" and "phosphate" are used, it is intended that thiophosphoric acid and thiophosphate respectively, shall be included within the scope thereof.

It has now been found that a stronger anti-enzymatic effect is inherent in substances consisting of polymer phosphoric acid compounds in which the phosphoric acid residues are interconnected by means or organic groups, which are glycosides of di- or polyhydroxy compounds of the flavone or flavanone series, such as phloridzin, dihydronaringinchalkone, naringin, hesperitin and rutin, and where the polymer compound has a molecular weight of not less than 2000, but, however, not higher than the compound is still being soluble in water or alkali.

The fundamental or primary substances which would be of interest and of which polymer phosphoric acid compounds may be formed according to the invention, may primarily be described as glycosides of substances of the following formula:

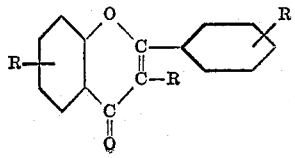

or

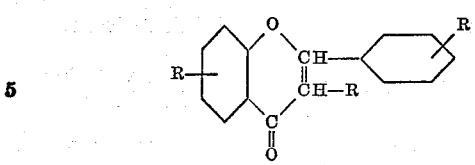

where R stands for hydrogen or one or more hydroxy or alkoxy groups. At least one of the hydroxy groups partakes in the glycoside formation, and besides this hydroxy group the glycosides in question contain at least two hydroxy groups which are bound to the nucleus.

It is generally known that flavanones may also be available in the form of chalcones, which are easily re-converted to flavanones. This also applies to their glycosides. As far as the present invention is concerned it is of no importance whether the substances are present as flavanones or as chalcones, which is seen, for instance, from the fact that glycosides of hydrogenated chalcones are particularly suited for use according to the invention. Thus, by hydrogenation in alkaline solution naringin may be converted into a glycoside, which differs from the naturally occuring phloridzin only in the saccharide part and its position in the molecule.

The primary substances which may be used according to the invention, therefore, comprise also glycosides of such chalcone derivatives which are easily converted into flavanones or the dihydro-derivatives of such chalcone derivatives. In the above as well as in the following the said glycosides of di- or polyhydroxy compounds of flavones, flavanones and chalcone derivatives as well as the dihydro-derivatives of the latter, are included in the term glycosides of di- or polyhydroxy compounds of flavone or flavanone series.

To illustrate the possibilities of the structural composition of such products, the product may be mentioned which is obtained by phosphorylating a compound of the said kind, in the aromatic nuclei of which two phosphorylatable hydroxyl groups are present. This product consists primarily of chains of the type:

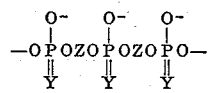

where Z represents glycosides, which may be alike or different, and Y, which represents groups which may also be alike or different, stands for oxygen or sulphur.

In said chains the third valencies of the phosphorus atoms are occupied by free hydroxyl groups, which are dissociated when the substance is dissolved. In certain cases, however, these third valencies may be linked to Z-groups, whereby the chains will be branched.

The constitution of the products may be considered sufficiently defined through the above definitions.

The glycosides may contain constituents other than the phosphoric acid groups serving for the formation of the said polymer structure. Thus it is of particular importance that the compounds may also contain acid phosphate or sulphate groups, particularly in the saccharide part, whereby the solubility in water increases, making it possible to obtain soluble products with a higher degree of polymerization than would be the case if these groups had not been present. Instead of being linked to the hydroxyl groups, the said substituents, which are different from the phosphoric acid groups serving to form the polymer structure, may also be linked to the carbon atoms of the carbon framework, for instance in the aromatic nuclei. As examples of the aglycones of the primary substances may be mentioned apiginin and diosmetin, both of which are polyhydroxy flavones, kämpferol, fisetin, quercetin and myricetin, all of which are polyhydroxy flavanoles, and further some ethers, such as rhamnetin and rhamnazetin. Further naringenin and hesperetin may be mentioned as examples of flavanones.

The saccharide part of the glycosides may be glucose, rutinose, arabinose, galactose and rhamnose as well as other glycoside forming saccharides and their derivatives, for instance desoxyhexose.

Such glycosides are very wide-spread in the vegetable kingdom, and many of them are articles of trade. They may also be produced synthetically.

In order to obtain as stable products as possible it has been found expedient to avoid certain glycosides derived from di- or polyhydroxy flavanones, for instance hesperidin which gives products of less stability.

In order to obtain a high anti-enzymatic effect it is of substantial importance that the polymerization degree is sufficiently high. Thus dialyzable compounds have only a quite insignificant anti-enzymatic effect. The lower limit of the molecular weight is accordingly about 2000. The higher limit is determined thereby that the products should be soluble in neutral or alkaline aqueous solutions.

Accordingly the invention also comprises a method for the production of anti-enzymatic substances of the said kind, said method consisting in that phosphoric acid residues are built to a polymer organic phosphoric acid compound, in which each phosphoric acid residue is linked to the next one through a glycoside or a glycoside derivative of the said kind, until a molecular weight of at least 2000 is reached.

The building up may take place by bringing a phosphorylating agent, such as phosphorus oxychloride, thiophosphoryl chloride or one of these together with phenylphosphoryl dichloride (phosphenyl chloride) to react with one or more glycosides or glycoside derivatives of the said kind under condensation conditions, preferably by means of a tertiary amine as a hydrogen halide-binding agent, whereafter the resulting condensation products are subjected to a hydrolysis. By the hydrolysis the groups are removed, for instance chlorine atoms, which are bound to the phosphoric acid residue in the phosphorylating agent in question, and which have not already been substituted by links to the organic radicals during the condensation, and the said halogen atoms are thereby replaced by hydroxyl groups so that free phosphoric acid groups are present in the condensation product, i. e. such in which one or two of the valencies of the phosphorus are linked through oxygen with an organic group, whereas the remaining two valencies or one valency are linked to hydroxyl groups, whereby the products get a strongly acid character and may form salts, of which the alkali salts may be soluble in water.

During the phosphorylation the primary substance may appropriately be in solution in a solvent which is not acted upon by the phosphorylating agent, whereby the solvent, if desired, may consist wholly or partly of the condensation agent itself, all according to the methods which are usually applied by the phosphorylating of organic substances. An expedient embodiment of the method according to the invention, whereby products with excellent antienzymatic properties are particularly safely obtained, is characterized in that suitable conditions for the condensation are maintained in the anhydrous medium for instance by cooling during the phosphorylation, by slow addition of the phosphorylating agent or the condensation agent, by periodical addition of these agents letting the reaction mixture stand in between, or by other similar means, until at least the desired degree of condensation is reached, whereafter the condensation is stopped and, if it has gone too far, the obtained product is hydrolyzed, for instance by the action of water, acid or alkali and, if desired, heating, until the degree of condensation has been brought down to the desired value.

In order to obtain a sufficient condensation it is expedient not to use a too great surplus of phosphorylating agent. Preferably the ratio between glycoside and phosphorylating agent is between ½ and $n$ mol phosphorylating agent to each mol of glycoside, $n$ being the number of hydroxyl present in the aglycone. Therefore, it is suitable to add the phosphorylating agent to a solution of the primary substance and not vice versa, since in the latter case the phosphorylating agent would be present in a disproportionately great surplus, in which case the phosphorylation might be terminated without sufficient condensation with the molecules of the primary substance having taken place. However, a certain adjusted proportion of the phosphorylating agent, corresponding to the amount of phosphorous contained in a resulting compound of the above constitution, may be present also at the start of the process in mixture with a primary substance and a possible solvent, in which case the phosphorylation is cautiously started by gradually adding the condensation agent. Finally the phosphorylation may be carried out without a condensation agent at all, but then it proceeds very slowly. As a condensation agent, in known manner a substance is used which is able to bind the component formed by the condensation in the anhydrous medium, for instance hydrogen chloride when phosphorus oxychloride, thiophosphoryl chloride or phenylphosphoryl dichloride is used as a phosphorylating agent.

By variation of the reaction conditions, for instance the reaction medium, the manner of addition, the velocity of addition, the amount of phosphorylating agent and other possible variables, products with differing properties may be obtained.

As stated above the solvent may be of a kind which is indifferent during the process. Suitable solvents for the purpose are for instance ether, dioxan, acetone and other ketone solvents.

However, the solvent may also be the condensation agent used in the process, for instance tertiary amines, among which pyridine, picoline, lutidine, quinoline and dimethylaniline may be mentioned as suitable. In certain cases it may also be expedient to use such condensation agents mixed with indifferent solvents.

Since the phosphorylation is accompanied by a heat evolution it is as a rule expedient to cool rather strongly in order to be able to regulate the process and thereby to ensure that good conditions for the condensation are maintained even during the first part of the phosphorylation, when a great surplus of the molecules of the primary substance is still present, the reactive groups of which are all free, i.e. not bound to phosphorus. To this end the reaction mixture may be in contact with cooled walls and for the cooling of such walls any suitable cooling agents may be used, for instance a cooled brine. In many cases, however, it is also expedient that the solution, in which the phosphorylating agent is going to react with the primary substance, is strongly cooled already before the reaction, for instance to —20 to —20° C. During the reaction a low temperature is then maintained which in practically all cases may be at room temperature or below, and only if the phosphorylation proceeds too slowly under these conditions is the temperature allowed to rise to a suitable higher value.

The time which is used for the primary phosphorylation process may as mentioned above be varied, particularly by varying the rate of addition of either the phosphorylating agent or the condensation agent. In most cases it is suitable that this time is not less than 30 seconds, but in many cases the said time may expediently be considerably increased, as appears from the following examples. Suitable times of addition are thus up to 1 hour, but in most cases it is possible without inconvenience to carry out the addition during ½ to 25 minutes. In certain cases it may be expedient to make the addition by turns with intervening periods of rest during which the temperature may be increased, if desired, for instance to room temperature or to a temperature between room temperature and 50° C., if this is necessary to obtain sufficient condensation within a reasonable time. When the addition is then resumed, care should be taken to cool so that the temperature does not increase so much that the process proceeds without control.

When the addition is finished, even if a substantial condensation has occurred during the addition, it is generally necessary or expedient to let the reaction product stand for a shorter or longer time in order that the condensation may reach at least the degree aimed at in the final product, i.e. that the molecular weight shall be 2000 or more and the produce not dialyzable. In many cases it is expedient that the reaction product is left to stand at room temperature, about 15–20° C., and, as appears from the following examples, a suitable condensation time is then generally ½ to 24 hours. It is evident that the time, during which the products should stand, may be shortened by increasing the temperature and generally no disadvantages are involved by increasing the temperature to about 50° C. However, the invention also comprises the use of still higher temperatures in the cases when such temperatures do not prevent obtaining suitable products according to the invention.

If by the phosphorylation or the subsequent condensation, products are directly obtained which after hydrolysis are soluble in alkaline aqueous solutions, it will be found that these have a good anti-enzymatic effect.

The reaction is then stopped by diluting with ice-water, whereby also phosphorylating agent which has not reacted is destroyed.

The produced polymer compound is now present in aqueous solution together with a hydrochloride of the tertiary amine which has been used. Depending on the properties, the thus produced substances may be purified by different methods. The most important of the properties, which are deciding for the kind of treatment to be used, is the stability of the compound in aqueous solution. If the compound has a good stability it may be purified by dialysis, succeeded by evaporation to dryness, if desired.

If, however, the substances have less stability in aqueous solution they may be isolated by cautiously evaporating to dryness the aqueous solution which is obtained after the reaction, without preceding dialysis. Thereby a colourless powder or semi-solid mass is generally obtained. This may then be purified, for instance by alternately dissolving in alkali and precipitating with acid saturated with common salt and, if desired, with ethanol.

As a measure of the inhibition of the enzymatic effect which is obtained with the new substances, the following examples give "percent inhibition" calculated according to the formula:

$$\text{Percent inhibition} = \frac{H_2 - H_1}{H_2} \times 100$$

where $H_1$ is the time of reaction which is necessary in order that the viscosity of a given hyaluronic acid solution, which is suitable as a substratum, is reduced to one half of the original on addition of a given solution of hyaluronidase, whereas $H_2$ is the reaction time which is necessary to halve the viscosity by the action of hyaluronidase on a mixture of the same hyaluronic acid solution with a substance with anti-hyaluronidase effect. In the drawings a diagram is exemplified in which the abscissa represents the time of action of the hyaluronidase, or mixture of hyaluronidase with the substance to be tested, on a standard solution of hyaluronic acid, and the ordinate represents the traversing time in an Oswald viscosimeter.

The curve 1 plots the relation between reaction time and viscosity by the use of bovine hyaluronidase. There is used 0.1 cc. of an enzyme solution containing two VRU (viscosity reducing unit, defined as an amount of enzyme, which reduces the viscosity of the substratum in question to one half of the original during 10 minutes). As a substratum there is used hyaluronic acid produced from umbilical cords according to a method by Jeanloz and Forchielli (J. Biol. Chem., 186, 495 (1950)). The solution contains 0.3% of this hyaluronic acid in a McIllvaines buffer mixture with pH=7. The enzyme solution is mixed with 3 ccs. of substratum and 0.9 ccs. of buffer.

The curve 2 plots the relation between reaction time and viscosity for a similar mixture which also contains the substance, the anti-hyaluronidase effect of which is to be tested. The ratio of mixture is 0.1 cc. of enzyme, 0.7 ccs. of buffer and 0.2 ccs. of a neutral aqueous solution of the substance, the anti-enzymatic effect of which is to be tested, and 3 ccs. of substratum.

The quantities $H_1$ and $H_2$ are determined by the points of intersection with the horizontal line A, the ordinate of which is determined as one half of the sum of the traversing times for the buffer solution and the substratum diluted with buffer mixture in the ratio 3:1, respectively.

The following examples illustrate the "percent inhibition," measured by the above method, which may be obtained by some of the substances produced according to the invention. By way of comparison it may be mentioned that after the same method the "percent inhibition" of suramin, which is stated by J. M. Beiler and J. G. Martin to have a greater inhibiting effect than the sulphonated and phosphorylated products produced by them, is found to be 0% by use of 40γ per 4 ccs., and to be 43% by use of 160γ per 4 ccs.

*Example 1*

4.4 g. of anhydrous phloridzin are dissolved in 25 ccs. of anhydrous pyridine. The solution is cooled to −10° C., whereafter a solution of 1.0 cc. of phosphorus oxychloride in 10 ccs. of anhydrous pyridine is added with cooling and shaking. Time of addition: 3 minutes. The mixture is left standing in a cooling bath for 3 hours and then at room temperature for 15 hours, whereby a viscous precipitate is formed. Hydrolysis is then carried out with finely crushed ice, whereby the precipitate dissolves slowly. The resulting solution is evaporated in vacuum, whereafter the residue is reacted upon by 2 N hydrochloric acid, saturated with common salt. Thereby a semi-solid mass is obtained, which is dissolved in a saturated solution of sodium bicarbonate. The solution is filtered and poured out into an equal volume of 2 N hydrochloric acid, saturated with common salt. Thereby a semi-solid mass is obtained which is dried over phosphorus pentoxide and potassium hydroxide. The product may then be pulverized. Yield 4.7 g. Inhibition (20γ/4 ccs.): 95%.

*Example 2*

4.4 g. of anhydrous phloridzin are dissolved in 25 ccs. of anhydrous pyridine. The solution is cooled to −10° C., whereafter a solution of 1.5 ccs. of phosphorus oxychloride in 10 ccs. of anhydrous pyridine is added with cooling and shaking. Time of addition: 3 minutes. The mixture is left to stand in a cooling bath. After 40 minutes the solution begins to become turbid. After a further 1 hour in the cooling bath hydrolysis is carried out with finely crushed ice, whereby all is dissolved. The solution is treated as in Example 1 and with the same result. Yield 5.15 g. Inhibition (20γ/4 ccs.): 95%.

*Example 3*

4.4 g. of anhydrous phloridzin are dissolved in 25 ccs. of anhydrous pyridine. The solution is cooled to −10° C., whereafter a solution of 2 ccs. of phosphorus oxychloride in 10 ccs. of anhydrous pyridine is added with cooling and shaking. Time of addition: 4 minutes. After 15 minutes in the cooling bath the solution has become thick and begins to become turbid. After a further 5 minutes it is hydrolyzed with finely crushed ice, whereby practically all is dissolved. The solution is treated as in Example 1 and with the same result. Yield 5.35 g. Inhibition (20γ/4 ccs.): 91%.

*Example 4*

2.2 g. of anhydrous phloridzin are dissolved in 20 ccs. of anhydrous pyridine. At −10° C. a solution of 1.5 ccs. of phosphorus oxychloride in 5 ccs. of anhydrous pyridine is added dropwise with shaking and cooling. Time of addition: 2 minutes. After a further 8 minutes in the cooling bath the solution has become turbid. 7 minutes later it is hydrolyzed with finely crushed ice, whereby practically all is dissolved. The solution is treated as in Example 1 and with the same result. Yield 2.5 g. Inhibition (20γ/4 ccs.): 56%.

*Example 5*

2.2 g. of anhydrous phloridzin are dissolved in 20 ccs. of anhydrous pyridine. At −10° C. a solution of 2.5 ccs. of phosphorus oxychloride in 10 ccs. of anhydrous pyridine is added with shaking and cooling. Time of addition: 5 minutes. After a further 3 minutes in the cooling bath the solution has become turbid. 7 minutes later it is hydrolyzed with finely crushed ice, whereby practically all is dissolved. The solution is treated as in Example 1 and with the same result. Yield 2.1 g. Inhibition (20γ/4 ccs.): 22%. If twice the amount of phosphorus oxychloride is used, a product is obtained showing no inhibition in the concentration of 20γ/4 ccs.

*Example 6*

15 ccs. of anhydrous pyridine are cooled to −10° C. in a cooling bath. 2.7 ccs. of chlorosulphonic acid are added cautiously with cooling and shaking. Then a solution of 8.7 g. of anhydrous phloridzin in 50 ccs. of anhydrous pyridine is added at −10° C. The mixture is slowly heated on a water bath to 90 C. and is then left to stand at room temperature for 15 hours. Then the mixture is cooled to −10° C. and a solution of 2 ccs. of phoshorus oxychloride in 10 ccs. of anhydrous pyridine is added with cooling and shaking. The mixture is left at room temperature for 2 days, whereafter it is hydrolyzed with finely crushed ice, whereby a clear solution is obtained. A solution of sodium carbonate is added to pH=9, whereafter dialyses against distilled water is carried out for 2 days. Then the solution is evaporated in vacuum, whereby a colourless powder is obtained, which is dried in vacuum over phosphorus pentoxide. Yield 11.4 g. Inhibition (20γ/4 ccs.): 85%. An analysis of the product gives the following result: 4.4% P, 8.9% S. This means that the product contains about 2 molecules of sulphur per molecule of phosphorus. The sulphuric acid groups, of course, are in the glycoside part.

*Example 7*

2.2 g. of anhydrous dihydronaringinchalkone are dissolved in 25 cc. of anhydrous pyridine. The solution is cooled to −10° C., whereafter a solution of 0.5 cc. of phosphorus oxychloride in 5 ccs. of anhydrous pyridine is added with cooling and shaking. Time of addition: 2.5 minutes. After about 5 hours in the cooling bath the solution has become viscous and is then hydrolyzed with finely crushed ice, whereby practically all is dissolved. The solution is treated as in Example 1 and with the same result. Yield: 2.6 g. Inhibition (20γ/4 ccs.): 22%.

*Example 8*

2.2 g. of anhydrous dihydronaringinchalkone are dissolved in 25 ccs. of anhydrous pyridine. The solution is cooled to −10° C., whereafter a solution of 1 cc. of phosphorus oxychloride in 5 ccs. of anhydrous pyridine is added with cooling and shaking. Time of addition: 3 minutes. After 25 minutes in the cooling bath the mixture has become viscous and turbid. It is then hydrolyzed with finely crushed ice, whereby a clear solution is obtained. This is evaporated in vacuum, whereafter the residue is treated with 2 N hydrochloric acid, saturated with common salt. Thereby a semi-solid mass is obtained, which is dissolved in a saturated solution of sodium bicarbonate. The solution is filtered and poured into an equal volume of 2 N hydrochloric acid, saturated with common salt. Thereby a colourless precipitate is obtained which is filtered off and dried over phosphorus pentoxide and potassium hydroxide. Yield 3.0 g. Inhibition (20γ/4 ccs.), 95%.

*Example 9*

2.2 g. of anhydrous dihydronaringinchalkone are dissolved in 25 ccs. of anhydrous pyridine. The solution is cooled to −10° C., whereafter a solution of 1.5 ccs. of phosphorus oxychloride in 5 ccs. of anhydrous pyridine is added with cooling and shaking. Time of addition: 3 minutes. After 15 minutes in the cooling bath the mixture has become viscous and turbid. Hydrolysis is then carried out with finely crushed ice, whereby a clear solution is obtained. This is evaporated in vacuum, whereafter the residue is treated with 2 N hydrochloric acid, saturated with common salt. Thereby a semi-solid mass is obtained, which is dissolved in a saturated solution of sodium bicarbonate. The solution is filtered and poured into an equal volume of 2 N hydrochloric acid, saturated with common salt. Thereby a colourless precipitate is obtained which is filtered off and dried over phosphorus pentoxide and potassium hydroxide. Yield: 2.2 g. Inhibition (20γ/4 ccs.): 90%.

*Example 10*

2.2 g. of anhydrous dihydronaringinchalkone are dissolved in 25 ccs. of anhydrous pyridine. The solution is cooled to −10° C., whereafter a solution of 2.5 ccs. of phosphorus oxychloride in 5 ccs. of anhydrous pyridine is added with cooling and shaking. Time of addition: 2 minutes. After 4 minutes in the cooling bath the solution begins to be turbid. After a further 6 minutes it is hydrolyzed with finely crushed ice, whereby the precipitate is slowly dissolved. The obtained solution is treated as in Example 1 and with the same result. Yield: 1.7 g. Inhibition (20γ/4 ccs.): 25%.

*Example 11*

1.1 g. of naringin are dissolved in 25 ccs. of anhydrous pyridine. The solution is cooled to −10° C., whereafter a solution of 0.5 cc. of phosphorus oxychloride in 5 ccs. of anhydrous pyridine is added with cooling and shaking. Time of addition: 5 minutes. After 3 hours in the cooling bath a precipitate has formed. The mixture is left to stand at room temperature for 15 hours, whereafter it is hydrolyzed with finely crushed ice. After 24 hours at room temperature a clear solution is obtained. This is evaporated in vacuum, and the residue is treated with 2 N hydrochloric acid, saturated with common salt, whereby a yellow powder is obtained. This is filtered off and dissolved in saturated solution of sodium bicarbonate. The solution is filtered and poured into an equal volume of 2 N hydrochloric acid, saturated with common salt. A yellow precipitate is obtained. This is filtered off and dried in vacuum over phosphorus pentoxide and potassium hydroxide. Yield: 1.5 g. Inhibition (20 γ/4 ccs.): 40%. If 0.75 cc. of phosphorus oxychloride are used instead of 0.5 cc. a product with the same inhibition is obtained, whereas an amount of 1.25 ccs. of phosphorus oxychloride gives a product with no inhibition in the concentration 20γ/4 ccs.

*Example 12*

1.2 g. of hesperidin are dissolved in 30 ccs. of anhydrous pyridine. The solution is cooled to −10° C., whereafter a solution of 0.25 cc. of phosphorus oxychloride in 5 ccs. of anhydrous pyridine is added with cooling and shaking. Time of addition: 1½ minutes. The mixture is left in the cooling bath for 2 hours and then at room temperature for 15 hours. Then it is hydrolyzed with finely crushed ice, whereby practically all is dissolved. The solution is then treated as in Example 11 and with the same result. Yield: 1 g. Inhibition (20γ/4 ccs.): 30%.

*Example 13*

1.2 g. of hesperidin are dissolved in 30 ccs. of anhydrous pyridine. The solution is cooled to −10° C., whereafter a solution of 0.75 cc. of phosphorus oxychloride in 10 ccs. of anhydrous pyridine is added with cooling and shaking. Time of addition: 3½ minutes. The mixture is left in the cooling bath for 2 hours, whereafter it is hydrolyzed with finely crushed ice, whereby practically all is dissolved. The solution is treated as in Example 11 and with the same result. Yield: 0.9 g. Inhibition (20γ/4 ccs.): 68%.

If 2.5 ccs. of phosphorus oxychloride is used, a product is obtained showing no inhibition in the concentration 20γ/4 ccs.

*Example 14*

1.2 g. of anhydrous rutin are dissolved in 25 ccs. of anhydrous pyridine. The solution is cooled to −10° C., whereafter a solution of 0.2 cc. of phosphorus oxychloride in 5 ccs. of anhydrous pyridine is added with cooling and shaking. Time of addition: 5 minutes. After 1¼ hours in the cooling bath the solution has begun to be turbid. It is then hydrolyzed with finely crushed ice, whereby practically all is dissolved. The solution is evaporated in vacuum and the residue, which is easily soluble in 2 N hydrochloric acid, saturated with common salt, is treated with anhydrous ethanol, whereby a yellow powder is obtained. This is filtered off, washed with anhydrous ethanol and dried in vacuum over phosphorus pentoxide. Yield: 0.8 g. Inhibition (20γ/4 ccs.): 40%.

*Example 15*

1.2 g. of anhydrous rutin are dissolved in 25 ccs. of anhydrous pyridine. The solution is cooled to −10° C., whereafter a solution of 0.4 cc. of phosphorus oxychloride in 5 ccs. of anhydrous pyridine is added with cooling and shaking. Time of addition: 3 minutes. After 4 minutes in the cooling bath the solution begins to be turbid and after a further 6 minutes it is hydrolyzed with finely crushed ice, whereby practically all is dissolved. The solution is treated as in Example 11 and with the same result. Yield: 1.1 g. Inhibition (20γ/4 ccs.): 57%.

*Example 16*

1.2 g. of anhydrous rutin are dissolved in 25 ccs. of anhydrous pyridine. The solution is cooled to −10° C., whereafter a solution of 0.6 cc. of phosphorus oxychloride in 5 ccs. of anhydrous pyridine is added with cooling and shaking. Time of addition: 2 minutes. After 1 minute in the cooling bath the solution begins to be turbid and after a further 4 minutes a copious precipitate has formed. It is then hydrolyzed with finely crushed ice. After 24 hours at room temperature practically all has dissolved. The solution is treated as in Example 11 and with the same result. Yield: 1.6 g. Inhibition (20γ/4 ccs.): 90%.

*Example 17*

1.2 g. of anhydrous rutin are dissolved in 25 ccs. of anhydrous pyridine. The solution is cooled to −10° C., whereafter a solution of 1.0 cc. of phosphorus oxychloride in 5 ccs. of anhydrous pyridine is added with cooling and shaking. Time of addition: 2 minutes. After 1 minute in the cooling bath the solution has become very turbid. Then it is hydrolyzed with finely crushed ice, whereby practically all is dissolved. The solution is then treated as in Example 11 and with the same result. Yield: 0.9 g. Inhibition (20γ/4 ccs.): 27%.

*Example 18*

1.1 g. of anhydrous phloridzin are dissolved in 15 ccs. of anhydrous pyridine. The solution is cooled to −10° C., whereafter a solution of 0.6 ccs. of thiophosphoryl chloride in 10 ccs. of anhydrous pyridine is added with cooling and shaking. Time of addition: 1½ minutes. The mixture is left in the cooling bath for 3 hours and then at room temperature for 15 hours, whereby a little precipitate is formed. Then it is hydrolyzed with finely crushed ice, whereby the precipitate slowly dissolves. The solution is treated as in Example 1 and with the same result. Yield: 1.25 g. Inhibition (20γ/4 ccs.): 100%.

*Example 19*

1.1 g. of anhydrous phloridzin are dissolved in 15 ccs. of anhydrous pyridine. The solution is cooled to −10° C., whereafter a solution of 0.9 ccs. of thiophosphoryl chloride in 10 ccs. of anhydrous pyridine is added with cooling and shaking. The mixture is left in a cooling bath for 3 hours and then at room temperature for 15 hours, whereby a slight precipitate is formed. Then it is hydrolyzed with finely crushed ice, whereby the precipitate dissolves slowly. The solution is treated as in Example 1 and with the same result. Yield: 1.3 g. Inhibition (20γ/4 ccs): 100%.

*Example 20*

4.36 g. of phloridzin are dissolved in 25 ml. of dioxan. Then 2.8 ml. of phosphorus oxychloride are added, and the solution is heated with reflux on a steam bath. After 50 minutes, the evolution of hydrogen chloride has finished and a red-brown precipitate has been formed. The reaction mixture is cooled and hydrolyzed with ice. 2 normal sodium hydroxide solution is added to make the reaction alkaline, whereby the major part of the precipitate formed by the phosphorylation dissolves. The undissolved part, which consists of a very high-molecular product, is filtered off, and after neutralizing with hydrochloric acid the filtrate is evaporated to dryness in vacuum. The residue is dissolved in water and precipitated with hydrochloric acid, whereby a red-brown precipitate is formed. This is filtered off, washed with 1 normal hydrochloric acid and dried in vacuum over phosphorus pentoxide and sodium hydroxide. The yield is 3.7 g. of a red-brown powder, the inhibition of which (50γ/4 ml.) is 50%.

*Example 21*

5.82 g. of rutin are suspended in 25 ml. of dioxan, whereafter 4.4 ml. of phosphorus oxychloride are added. The mixture is heated with reflux on a steam bath. After 30 minutes the evolution of hydrogen chloride has finished, and a dark viscous mass has precipitated. This mass is treated as in the previous example, yielding 6.0 g. of a dark-brown powder, the inhibition of which (50γ/4 ml.) is 60 percent.

We claim:

1. Anti-enzymatic substance consisting of polymer phosphoric acid compounds in which phosphoric acid radicals from a phosphorylating agent are inter-connected by ester linkages through organic groups, each organic group being a residue of a glycoside of a polyhydroxy compound selected from the class consisting of flavones, flavanones, chalkones and dihydrochalkones with at least two phenolic hydroxyl groups not partaking in the glycoside formation, the ratio of phosphorylating agent to glycoside being between ½ and $n$ mols of phosphorylating agent to each mol of glycoside, $n$ being the number of hydroxyl groups present in the aglycone portion of the glycoside, the polymer compound having a molecular weight of at least 2000, but, however, not higher than it is still soluble in water or alkali.

2. The anti-enzymatic substance of claim 1, in which phosphoric acid radicals are present in excess of the phosphoric acid radicals serving to form the polymer structure, the excess radicals forming acid phosphate radicals connected to the hydroxyl groups of the saccharide part.

3. The anti-enzymatic substance of claim 1, in which sulfuric acid radicals are present in the glycosides.

4. The anti-enzymatic substance as set forth in claim 1 in which the glycoside is phloridzin.

5. The anti-enzymatic substance as set forth in claim 1 in which the glycoside is naringin.

6. The anti-enzymatic substance as set forth in claim 1 in which the glycoside is hesperidin.

7. The anti-enzymatic substance as set forth in claim 1 in which the glycoside is rutin.

References Cited in the file of this patent

UNITED STATES PATENTS 2,465,320     Bergel _____ Mar. 22, 1949

FOREIGN PATENTS 887,951     France _____ Nov. 3, 1943

OTHER REFERENCES

Beiler et al.: J. Biol. Chem., 1948, vol. 174, pp. 31 to 33.